United States Patent
Liu et al.

(10) Patent No.: US 9,578,516 B2
(45) Date of Patent: Feb. 21, 2017

(54) RADIO SYSTEM AND SPECTRUM RESOURCE RECONFIGURATION METHOD THEREOF

(71) Applicant: ZTE Corporation, Shenzhen, Guangdong (CN)

(72) Inventors: Xing Liu, Shenzhen (CN); Yan Li, Shenzhen (CN); Bin Wang, Shenzhen (CN); Dong Zhou, Shenzhen (CN); Ting Miao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/379,172

(22) PCT Filed: Feb. 7, 2013

(86) PCT No.: PCT/CN2013/071548
§ 371 (c)(1),
(2) Date: Aug. 15, 2014

(87) PCT Pub. No.: WO2013/120444
PCT Pub. Date: Aug. 22, 2013

(65) Prior Publication Data
US 2015/0031376 A1    Jan. 29, 2015

(30) Foreign Application Priority Data
Feb. 17, 2012 (CN) .......................... 2012 1 0037040

(51) Int. Cl.
*H04W 72/00*    (2009.01)
*H04W 16/14*    (2009.01)
(Continued)

(52) U.S. Cl.
CPC ................ *H04W 16/14* (2013.01); *H04L 5/00* (2013.01); *H04W 16/10* (2013.01); *H04W 24/02* (2013.01); *H04W 16/32* (2013.01); *H04W 72/121* (2013.01)

(58) Field of Classification Search
CPC ...... H04W 16/14; H04W 24/02; H04W 16/10; H04W 72/121; H04W 16/32; H04L 5/00
(Continued)

(56) References Cited

U.S. PATENT DOCUMENTS

2008/0273503 A1\* 11/2008 Lee et al. ...................... 370/336
2010/0151864 A1\* 6/2010 Mori ............................. 455/436
(Continued)

FOREIGN PATENT DOCUMENTS

CN    101778436 A    7/2010
CN    101909303 A    12/2010
(Continued)

OTHER PUBLICATIONS

International Search Report in international application No. PCT/CN2013/071548, mailed on May 16, 2013. (2 pages—see entire document).
(Continued)

*Primary Examiner* — Dhaval Patel
(74) *Attorney, Agent, or Firm* — Oppedahl Patent Law Firm LLC

(57) ABSTRACT

Disclose is a radio system and a spectrum resource reconfiguration method thereof. The method comprises: a Reconfigurable Base Station (RBS) divides subordinate nodes into groups according to attributes of the subordinate nodes, and sends a reconfiguration command to a subordinate node in a designated group, and the RBS and the subordinate node execute reconfiguration of spectrum resources according to the reconfiguration command; or, the RBS executes reconfiguration of spectrum resources according to the reconfiguration command; and a subordinate User Equipment (UE)
(Continued)

accessing to a reconfigured RBS after interruption. By means of the present disclosure, the reconfiguration of spectrum resources of a cognitive radio system can be realized.

11 Claims, 10 Drawing Sheets

(51) Int. Cl.
*H04W 24/02* (2009.01)
*H04L 5/00* (2006.01)
*H04W 16/10* (2009.01)
*H04W 16/32* (2009.01)
*H04W 72/12* (2009.01)

(58) Field of Classification Search
USPC ............. 455/450, 418, 411, 522, 422.1, 454, 436,455/458, 507, 525, 453, 437; 370/311, 331, 370/252, 329, 241
See application file for complete search history.

(56) References Cited

U.S. PATENT DOCUMENTS

| 2011/0014915 | A1 | 1/2011 | Chen | |
|---|---|---|---|---|
| 2012/0140704 | A1* | 6/2012 | Zhao | ..................... H04L 1/1874 370/315 |
| 2013/0203416 | A1* | 8/2013 | Raaf et al. | .................... 455/436 |

FOREIGN PATENT DOCUMENTS

| CN | 102137409 A | 7/2011 | |
|---|---|---|---|
| CN | 102281553 A | 12/2011 | |
| WO | WO 2011020233 A1 * | 2/2011 | ........... H04L 1/1874 |

OTHER PUBLICATIONS

English Translation of the Written Opinion of the International Search Authority in international application No. PCT/CN2013/071548, mailed on May 16, 2013. (14 pages—see entire document).
Supplementary European Search Report in European application No. 13748945.6, mailed on Dec. 22, 2015.

* cited by examiner

RADIO SYSTEM AND SPECTRUM RESOURCE RECONFIGURATION METHOD THEREOF

TECHNICAL FIELD

The present disclosure relates to the field of radio communication, and particularly to a radio system and a spectrum resource reconfiguration method thereof.

BACKGROUND

With the development of radio technology, various radio services emerge massively while spectrum resources, on which radio services rely, are limited. Therefore, more and more bandwidths are demanded, which leads to a shortage of spectrum resources. On the other hand, in a conventional spectrum fixed allocation system, the utilization ratio of spectrum resources is low. In a sense, it is such a spectrum allocation system providing fixed allocation to an authorization system that causes the great shortage of spectrum resources.

Cognitive radio technology breaks through the conventional spectrum fixed allocation system to allocate spectrums dynamically among systems, thus improving the utilization efficiency of spectrums. For example, as requirements on daily communication are increasing and simple voice data communication is no longer satisfactory, the proportion of video stream media services are increasing in people's communication life, which requires more bandwidths. International Mobile Telecom (IMT) systems are in unprecedented shortage of spectrums while there are many available spectrum resources for broadcast Television (TV) systems to a great extent, e.g. spectrums of some broadcast TV systems are unused in some areas while spectrums of some broadcast TV systems are covered in some area, but unused in some moments, thus resulting in a low overall utilization ratio. Because of the spectrum fixed allocation system, the unused spectrum resources can be hardly reused, by an IMT system, for example. An IMT system of cognitive radio technology acquires information of a broadcast TV system to take an opportunity to occupy TV White spaces of the broadcast TV system in time and space, thus improving the utilization ratio of spectrums of the broadcast TV system and easing the shortage of spectrums of the IMT system.

When a secondary system takes an opportunity to improve the overall performance of a network by using spectrum resources of a main system, the Quality of Service (QoS) of the main system should also be guaranteed, e.g. a reliable power control mechanism and a main user discovery technology etc. are used to ensure that the main system is not interfered. When a main user to which a spectrum occupied by the secondary system reappears, i.e. when the main user will reuse a spectrum resource original borrowed by the secondary system, in order to strictly ensure that the secondary system will not cause harmful interference to the main user, the secondary system will not use the spectrum and sends a reconfiguration command to a User Equipment (UE) serving on the spectrum to require the UE to exit the corresponding spectrum. Further, the secondary system will search for available idle spectrum resources over again or return to an authorized frequency of the secondary system and notify information of a reconfigured spectrum resource to a UE served by the secondary system to provide services for the UE continuously. Thus, communication needs to be performed among network nodes, key parameters need to be configured, and corresponding processes need to be guaranteed, but there are no feasible methods to solve these problems in the prior art.

SUMMARY

In view of the above, the present disclosure provides a radio system and a spectrum resource reconfiguration method thereof to realize reconfiguration of spectrum resources of a cognitive radio system.

Therefore, the technical solution of the embodiments of the present disclosure is realized by the following way:

an embodiment of the present disclosure provides a method for reconfiguring a spectrum resource of a radio system, including:

a Reconfigurable Base Station (RBS) divides subordinate nodes into groups according to attributes of the subordinate nodes, and sends a reconfiguration command to a subordinate node in a designated group;

the RBS and the subordinate node execute reconfiguration of spectrum resources according to the reconfiguration command.

In the method, the reconfiguration command is generated by a reconfiguration decision module, and the reconfiguration decision module is located in a base station or in a node of an upper layer of the base station;

when the reconfiguration decision module is located in the node of the upper layer of the base station, the method further includes: the RBS receives the reconfiguration command from the reconfiguration decision module, filters and/or converts the received reconfiguration command, and sends the filtered and/or converted reconfiguration command to the subordinate node.

In the method, the reconfiguration command carries a reconfiguration command sending parameter, the reconfiguration command sending parameter includes: a reconfiguration time, and/or a reconfiguration target frequency band, and/or transmitting parameter limitation of the target frequency band, and/or an allowed working time, and/or a reconfiguration coverage area.

In the method, the attributes of the subordinate nodes include: positions, and/or frequencies, and/or QoS, and/or access time.

In the method,

The step that the RBS divides subordinate nodes into groups according to the attributes of the subordinate nodes may include: apply the same reconfiguration strategy to subordinate nodes in the same group, and the same reconfiguration command accordingly; configure, by the RBS, the same identifier for the subordinate nodes in the same group; find, by the RBS, all subordinate nodes in the group according to the identifier.

In the method,

The step of sending a reconfiguration command to a subordinate node in a designated group may include: the RBS sends the reconfiguration command to a designated subordinate node by means of group transmission, i.e. a point-to-multipoint reconfiguration command sending method is applied to the subordinate node in the designated group.

In the method, when the group only contains one subordinate node, the reconfiguration command is sent to the subordinate node separately; when the group contains all subordinate nodes of the RBS, a unified sending method is applied.

In the method, the method further includes:

when the subordinate node accesses a network initially, the RBS allocates an independent identifier for the subordinate node, and/or allocates a group identifier after grouping according to attributes, and/or allocates identifiers for all subordinates;

when the reconfiguration command is sent by groups, after a subordinate node obtains an identifier, update a group identifier continuously according to attribute changes of the subordinate node during subsequent running.

In the method, when the reconfiguration of the spectrum resources is triggered, generate, by a reconfiguration decision module, the reconfiguration command, and/or when the reconfiguration decision module is located in a node of an upper layer of a base station, before sending, by the RBS, the received reconfiguration command to the subordinate node, the method further includes: send, by the RBS, a feedback acknowledgement message to the reconfiguration decision module, and/or after executing, by the RBS and the subordinate node, the reconfiguration of the spectrum resources, the method further includes: after completing the reconfiguration of the spectrum resources, feed back, by the RBS, a reconfiguration situation to the reconfiguration decision module.

An embodiment of the present disclosure further provides method for reconfiguring a spectrum resource of a radio system. The method includes:

an RBS executes reconfiguration of spectrum resources according to a reconfiguration command;

a subordinate UE accesses to a reconfigured RBS after interruption.

In the method, the reconfiguration command is generated by a reconfiguration decision module, and the reconfiguration decision module is located in a base station or in a node of an upper layer of the base station;

when the reconfiguration decision module is located in the node of the upper layer of the base station, the RBS receives the reconfiguration command from the reconfiguration decision module.

In the method, the reconfiguration command carries a reconfiguration command sending parameter, the reconfiguration command sending parameter includes: a reconfiguration time, and/or a reconfiguration target frequency band, and/or transmitting parameter limitation of the target frequency band, and/or an allowed working time, and/or a reconfiguration coverage area.

An embodiment of the present disclosure further provides a radio system. The system includes: a Reconfigurable Base Station (RBS) and subordinate nodes, wherein the RBS is configured to divide subordinate nodes into groups according to attributes of the subordinate nodes, send a reconfiguration command to a subordinate node in a designated group, and execute reconfiguration of spectrum resources according to the reconfiguration command;

the subordinate node is configured to execute reconfiguration of spectrum resources according to the reconfiguration command.

In the system, the system further includes: a reconfiguration decision module configured to generate the reconfiguration command; the reconfiguration decision module is located in a base station or in a node of an upper layer of the base station;

the RBS is further configured to, when the reconfiguration decision module is located in the node of the upper layer of the base station, receive the reconfiguration command from the reconfiguration decision module, filter and/or convert the received reconfiguration command, and send the filtered and/or converted reconfiguration command to the subordinate node.

In the system, the RBS is further configured to, before sending the received reconfiguration command to the subordinate node, send a feedback acknowledgement message to the reconfiguration decision module, and/or the RBS is further configured to, after completing the reconfiguration of the spectrum resources, feed back a reconfiguration situation to the reconfiguration decision module.

An embodiment of the present disclosure further provides a radio system. The system includes: a Reconfigurable Base Station (RBS) and subordinate nodes; the RBS further includes a reconfiguration decision module and a resource reconfiguration module, wherein the reconfiguration decision module is configured to, when reconfiguration of spectrum resources is triggered, generate a reconfiguration command, and divides subordinate nodes into groups according to attributes of the subordinate nodes, and send the reconfiguration command to a subordinate node in a designated group and the resource reconfiguration module; the reconfiguration decision module is located in a base station or a node of an upper layer of the base station;

the resource reconfiguration module is configured to execute the reconfiguration of the spectrum resources according to the reconfiguration command;

the subordinate node is configured to execute the reconfiguration of the spectrum resources according to the reconfiguration command.

An embodiment of the present disclosure further provides a radio system. The system includes: a Reconfigurable Base Station (RBS) and subordinate User Equipments (UE), wherein the RBS is configured to execute reconfiguration of spectrum resources according to a reconfiguration command;

the subordinate UE is configured to access to a reconfigured RBS after interruption.

In the system, the system further includes: a reconfiguration decision module configured to, when the reconfiguration of the spectrum resources is triggered, generate the reconfiguration command, and send the reconfiguration command to a subordinate RBS related to the reconfiguration of the spectrum resources; the reconfiguration decision module is located in a base station or a node of an upper layer of the base station;

the RBS is further configured to, when the reconfiguration decision module is located in the node of the upper layer of the base station, receive the reconfiguration command from the reconfiguration decision module.

An embodiment of the present disclosure further provides a radio system, wherein the system includes: a Reconfigurable Base Station (RBS) and a subordinate UE, wherein the RBS further includes a reconfiguration decision module and a resource reconfiguration module, wherein the reconfiguration decision module is configured to, when reconfiguration of spectrum resources is triggered, generate a reconfiguration command, and send the reconfirmation command to a subordinate resource reconfiguration module related to the reconfiguration of the spectrum resources; the reconfiguration decision module is located in a base station or a node of an upper layer of the base station;

the resource reconfiguration module is configured to execute the reconfiguration of the reconfiguration command;

the subordinate UE is configured to access to a reconfigured RBS after interruption.

According to a radio system and a spectrum resource reconfiguration method thereof provided by the embodiments of the present disclosure, when reconfiguration of spectrum resources is triggered, an RBS divides subordinate nodes into groups according to attributes of the subordinate nodes, and sends a reconfiguration command to a subordinate node in a designated group, and the RBS and the subordinate node execute reconfiguration of spectrum resources according to the reconfiguration command, or, the RBS execute reconfiguration of spectrum resources according to the reconfiguration command; and a subordinate UE accesses to a reconfigured RBS after interruption. Specifically, the reconfiguration command is generated by a reconfiguration decision module. The reconfiguration decision module is located in a base station, or a node of an upper layer of the base station. Therefore, the present disclosure can realize reconfiguration of spectrum resources of a cognitive radio system to overcome the defect that there is no feasible method to realize reconfiguration of spectrum resources of a cognitive radio system in the prior art. In addition, three reconfiguration command sending methods are defined in the embodiments of the present disclosure, i.e. an separate sending method, a group sending method and a unified sending method, which can be applied flexibly according to a reconfiguration range and attributes of nodes involved in reconfiguration, thus overcoming the problem of low efficiency of each reconfiguration operation only directed to point-to-point separate transmission during large-scale reconfiguration operations.

DETAILED DESCRIPTION

The present disclosure will be further described in details below through the accompanying drawings and specific embodiments.

Figure 1:
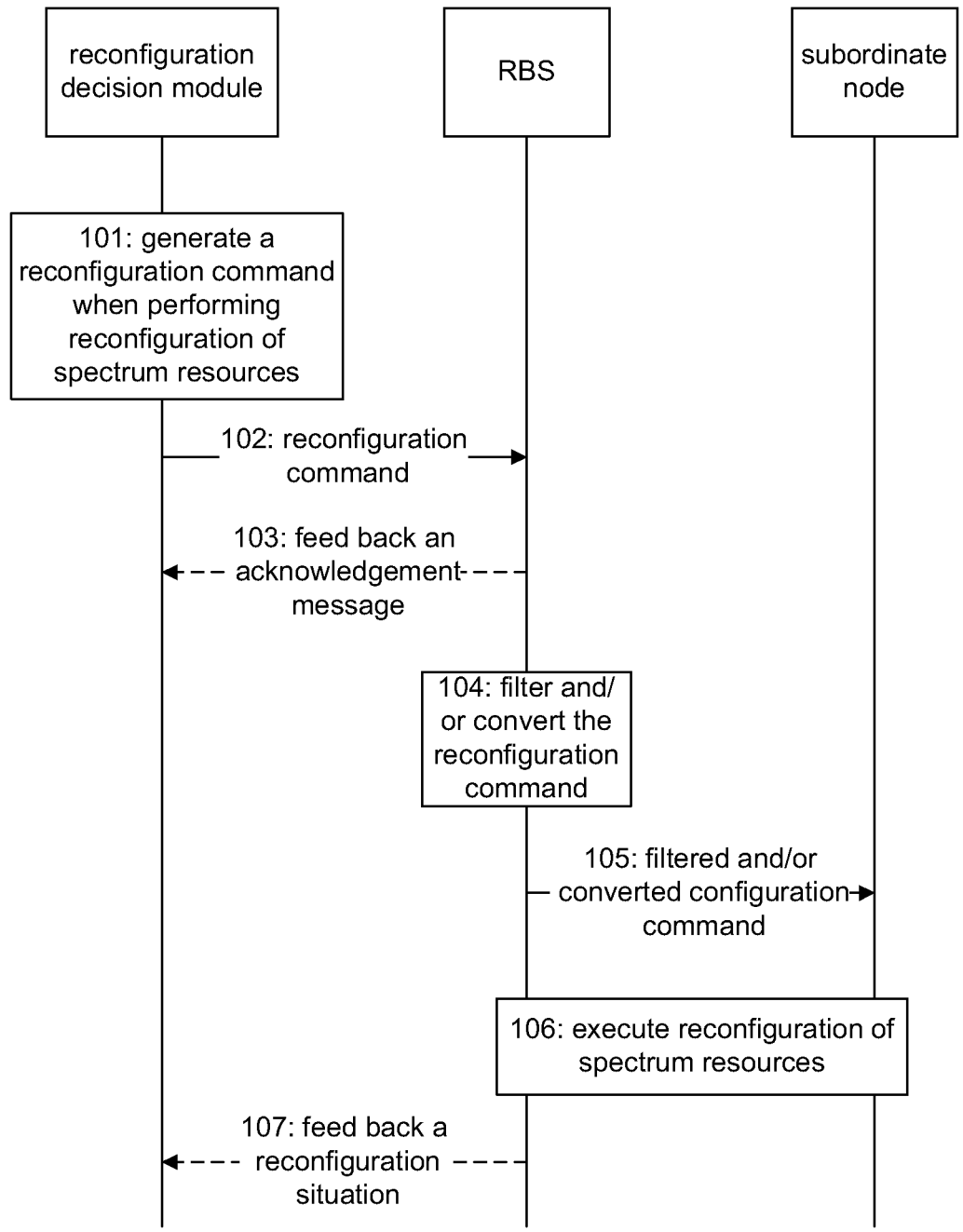
FIG. 1 is a flowchart of a first method for implementing reconfiguration of spectrum resources of a radio system according to an embodiment of the present disclosure.

An embodiment of the present disclosure provides a spectrum resource reconfiguration method of a radio system. FIG. 1 is a flowchart of a first method for implementing reconfiguration of spectrum resources of a radio system according to an embodiment of the present disclosure. The method is applied to the scenario that a reconfiguration decision module is located in an upper layer of an RBS. As shown in FIG. 1, the method includes the following steps:

Step 101: when reconfiguration of spectrum resources is triggered, generate, by a reconfiguration decision module, a reconfiguration command;

specifically, reconfiguration of spectrum resources can be triggered in the case of appearance of a main user, configuration of Operation Administration and Maintenance (OAM), a request of an adjacent reconfiguration decision module and an idle spectrum resource application sent by an RBS, wherein the appearance of the main user means that the main user will reuse a spectrum resource originally borrowed by a secondary system, which can be sensed, measured and discovered by a subordinate node of the reconfiguration decision module and notified to the reconfiguration decision module, or may be also notified to the reconfiguration decision module by a main user spectrum use situation database; the configuration of OAM means that OAM makes a spectrum resource optimization decision to notify the reconfiguration decision module to further transmit a reconfiguration command, and so on; the request of the adjacent reconfiguration decision module means that when a reconfiguration decision module adjacent to the reconfiguration decision module is reconfigured according to requirements of itself, since the reconfiguration affects use of spectrums of a subordinate node of the reconfiguration decision module, e.g. interference is caused etc., the adjacent reconfiguration decision module needs to send a request to the reconfiguration decision module to negotiate use of spectrum resources; an idle spectrum resource request of a subordinate node means that a subordinate node of the reconfiguration decision module triggers a request for an idle spectrum resource due to shortage of spectrum resources, and/or the incapability of the communication quality of a subordinate link in meeting QoS requirements (e.g. bad conditions of communication quality);

after reconfiguration of spectrum resources is triggered, the reconfiguration decision module generates a reconfiguration command; the reconfiguration decision module may run reconfiguration algorithms according to different reasons of triggering reconfiguration of spectrum resources to generate different reconfiguration decisions and then generates a reconfiguration command according a reconfiguration decision; the reconfiguration command carries a reconfiguration command sending parameter; the reconfiguration command sending parameter includes parameters including reconfiguration time, or a reconfiguration target frequency band, transmitting parameter limitation of the target frequency band, allowed working time, a reconfiguration coverage area etc.

The reconfiguration time is configured to specify a time limitation of completing reconfiguration, e.g. reconfiguration required by the reconfiguration command is completed within 5 s; the reconfiguration target frequency band refers a spectrum resource to which to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on a reconfigured target frequency band in the case that reconfiguration does not need to be acknowledged through sensing or accessing a database, e.g. the allowed working time is specified to be 2 h; 2 h later, it needs to acknowledge, through sensing or accessing the database, whether to continue to use reconfigured target frequency band or not, or the reconfigured target frequency band is exited directly; the reconfiguration coverage area refers to a reconfiguration area involved in the reconfiguration command and is configured to determine a range of subordinate nodes involved in reconfiguration of spectrum resources;

Step 102: the reconfiguration decision module sends the reconfiguration command to a subordinate RBS related to the reconfiguration of the spectrum resources;

specifically, when the reconfiguration decision module is located in a node of an upper layer of an RBS, the reconfiguration decision module sends the reconfiguration command to the subordinate RBS related to the reconfiguration of the spectrum resources; when the reconfiguration decision module sends the reconfiguration command to the RBS, the reconfiguration command is sent separately, wherein separate sending method means that when the reconfiguration decision module sends the reconfiguration command to the RBS, the reconfiguration command only involves one RBS, and a point-to-point method for sending the reconfiguration command is applied; the RBS is provided with an independent identifier; the reconfiguration module can find the RBS through the identifier;

Step 103: the RBS sends a feedback an acknowledgement message to the reconfiguration decision module;

specifically and optionally, a command processing module of the RBS sends a feedback acknowledgment message to the reconfiguration decision module to indicate that reconfiguration of spectrum resources will be performed according to the reconfiguration command;

Step 104: the RBS filters and/or converts the received reconfiguration command;

specifically, the command processing module of the RBS converts the reconfiguration command received from the reconfiguration decision module, and filters parameters not related to a spectrum resource configuration operation performed by a subordinate node in the reconfiguration command, and/or converts parameters related to a spectrum resource configuration operation performed by the subordinate node into a reconfiguration command recognizable by the subordinate node;

Step 105: the RBS sends the filtered and/or converted reconfiguration command to the subordinate node;

specifically, the command processing module of the RBS sends the filtered and/or converted reconfiguration command to the subordinate node; the subordinate node includes a UE or an Access Point (AP); methods for sending the reconfiguration command include a separate sending method, and/or a group sending method, and/or a unified sending method, wherein the separate sending method means that when the RBS sends the reconfiguration command to the subordinate node, the reconfiguration command only involves one subordinate node; a point-to-point reconfiguration command sending method is applied; the subordinate node is provided with an independent identifier; the identifier may be a Cell Radio Network Temporary Identifier (C-RNTI) in existing standards, and may be also an identifier redefined for reconfiguration of spectrum resources; the RBS can find the subordinate node through the identifier;

the group sending method means that the RBS applies a point-to-multipoint reconfiguration command sending method to part of the subordinate nodes; the RBS divides subordinate nodes into groups according to attributes (e.g. position, frequency, QoS, access time etc.) of subordinate nodes, and applies the same reconfiguration strategy for subordinate nodes in the same group, and the same reconfiguration command accordingly; the RBS configures the same identifier for subordinate nodes in the same group, i.e. the RBS can find all subordinate nodes in the group according to the identifier;

the unified sending method means that the RBS sends the reconfiguration command to all subordinate nodes; the RBS configures the same identifier for all subordinate nodes; the identifier may be a node identifier in existing standards, and may be also an identifier redefined for reconfiguration of spectrum resources; through the identifier, the RBS may control all subordinate nodes to perform reconfiguration of spectrum resources; at the moment, the message may be added to a system broadcasting message to be sent, for example; the identifier may be a System Information-RNTI (SI-RNTI), in existing standards and may be also an identifier redefined for reconfiguration;

the three reconfiguration command sending methods may be used in a mixed manner during the same transmission of a reconfiguration command, i.e. different or the same reconfiguration command sending method may be applied to different subordinate nodes according to actual conditions; for example, the RBS may send the reconfiguration command to the subordinate node by a mixed sending method consisting of the separate sending method and the group sending method;

here, when the subordinate node of the RBS accesses a network initially, the network side allocates an independent identifier (e.g. a C-RNTI or a redefined identifier) for the subordinate node, and/or allocates a group identifier obtained after performing grouping according to different attributes, and/or allocates an identifier (e.g. SI-RNTI) for all subordinate nodes; for the group sending method, after the subordinate node obtains an identifier initially, the group identifier may be updated continuously according to attribute changes of the subordinate node in subsequent operation;

Step 106: the RBS and the subordinate node execute reconfiguration of spectrum resources according to the reconfiguration command;

specifically, a resource reconfiguration module and the subordinate node (UE or AP) of the RBS in a reconfiguration coverage area execute, according to a parameter in the reconfiguration command, reconfiguration of spectrum resources; during the reconfiguration, the spectrum resources are reconfigured to a target frequency band, communication is performed according to a limited transmitting parameter and limitation on the allowed working time is satisfied simultaneously;

Step 107: after completing reconfiguration of spectrum resources, the RBS feeds back a reconfiguration situation to the reconfiguration decision module;

specifically and optionally, after the resource reconfiguration module of the RBS and the subordinate node complete reconfiguration of spectrum resources, the resource reconfiguration module of the RBS feeds back a reconfiguration situation to the reconfiguration decision module.

Figure 2:
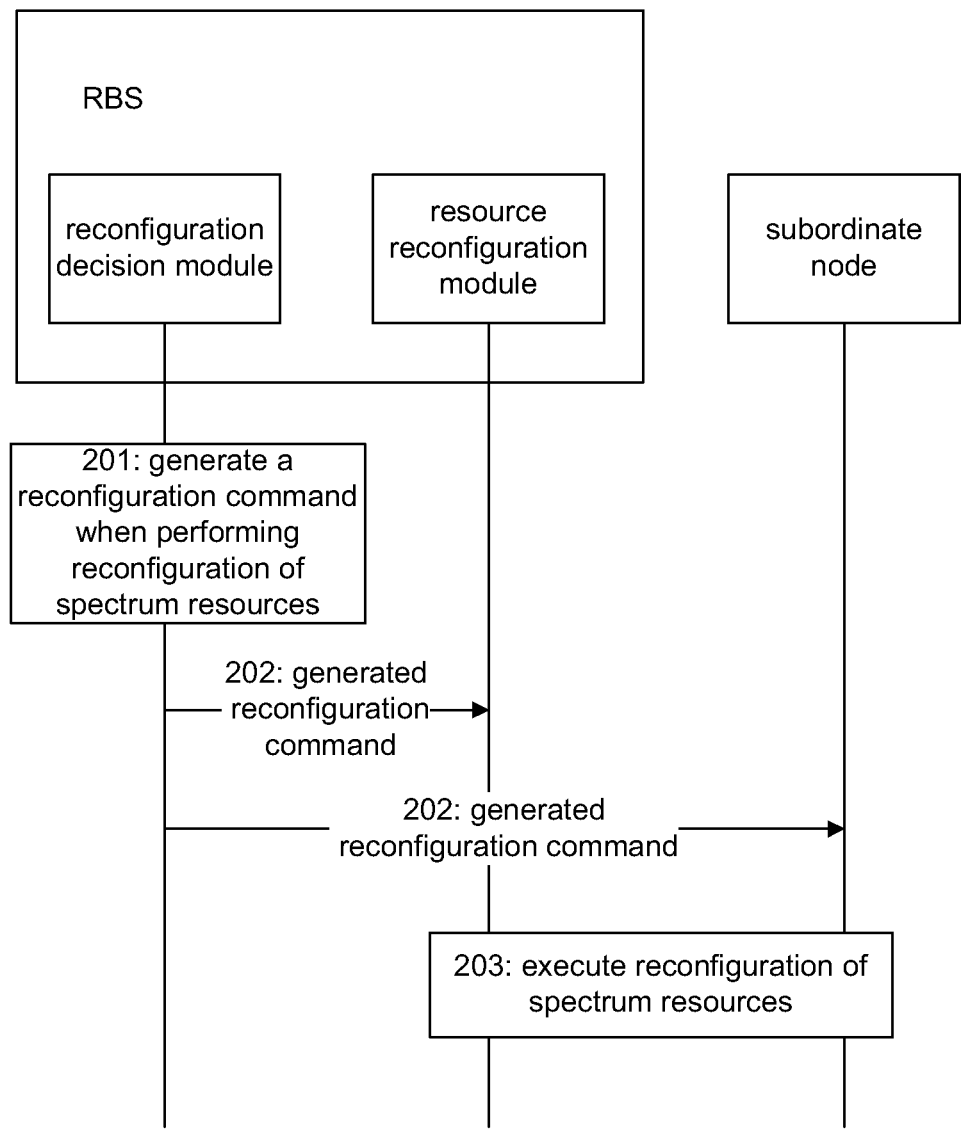
FIG. 2 is a flowchart of a second method for implementing reconfiguration of spectrum resources of a radio system according to an embodiment of the present disclosure.

FIG. 2 is a flowchart of the second method for implementing reconfiguration of spectrum resources of a radio system of an embodiment of the present disclosure. The method is applied to the scenario that a reconfiguration decision module is located in an RBS. As shown in FIG. 2, the method includes the following steps:

Step 201: when reconfiguration of spectrum resources is triggered, a reconfiguration decision module of an RBS generates a reconfiguration command;

specifically, reconfiguration of spectrum resources can be triggered in the case of appearance of a main user, configuration of OAM, a request of an adjacent reconfiguration decision module and an idle spectrum resource application sent by an RBS, wherein the appearance of the main user means that the main user will reuse a spectrum resource originally borrowed by a secondary system, which can be sensed, measured and discovered by a subordinate node of the reconfiguration decision module and notified to the reconfiguration decision module, or may be also notified to the reconfiguration decision module by a main user spectrum use situation database; the configuration of OAM means that OAM makes a spectrum resource optimization decision to notify the reconfiguration decision module to further transmit a reconfiguration command, and so on; the request of the adjacent reconfiguration decision module means that when a reconfiguration decision module adjacent to the reconfiguration decision module is reconfigured according to requirements of itself, since the reconfiguration affects use of spectrums of a subordinate node of the reconfiguration decision module, e.g. interference is caused etc., the adjacent reconfiguration decision module needs to send a request to the reconfiguration decision module to negotiate use of spectrum resources; an idle spectrum resource request of a subordinate node means that a subordinate node of the reconfiguration decision module triggers an application of an idle spectrum resource due to shortage of spectrum resources, and/or the incapability of the communication quality of a subordinate link in meeting QoS requirements (e.g. bad conditions of communication quality);

after reconfiguration of spectrum resources is triggered, the reconfiguration decision module of the RBS generates a reconfiguration command; the reconfiguration decision module may run reconfiguration algorithms according to different reasons of triggering reconfiguration of spectrum resources to generate different reconfiguration decisions and then generates a reconfiguration command according a reconfiguration decision; the reconfiguration command carries a reconfiguration command sending parameter; the reconfiguration command sending parameter includes parameters including: reconfiguration time, a reconfiguration target frequency band, transmitting parameter limitation of the target frequency band, allowed working time, a reconfiguration coverage area etc.;

wherein the reconfiguration time is configured to specify a time limitation of completing reconfiguration, e.g. reconfiguration required by the reconfiguration command is completed within 5 s; the reconfiguration target frequency band refers a spectrum resource that needs to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on a reconfigured target frequency band in the case that reconfiguration does not need to be acknowledged through sensing or accessing a database, e.g. the allowed working time is specified to be 2 h; 2 h later, it needs to acknowledge, through sensing or accessing the database, whether to continue to use reconfigured target frequency band or not, or the reconfigured target frequency band is exited directly; the reconfiguration coverage area refers to a reconfiguration area involved in the reconfiguration command and is configured to determine a range of subordinate nodes involved in reconfiguration of spectrum resources;

Step 202: the reconfiguration decision module of the RBS sends the generated reconfiguration command to a subordinate node and a resource reconfiguration module of the RBS;

specifically, the reconfiguration decision module of the RBS sends the generated reconfiguration command to the subordinate node and the resource reconfiguration module of the RBS; the subordinate node includes a UE or an AP; a method for sending the reconfiguration command to the subordinate node is the same of the method of sending the reconfiguration command to the subordinate node by the RBS in Step 105 and will not be repeated here;

here, when the subordinate node of the RBS accesses a network initially, the network side allocates an independent identifier (e.g. a C-RNTI or a redefined identifier) for the subordinate node, and/or allocates a group identifier obtained after performing grouping according to different attributes, and/or allocates an identifier (e.g. SI-RNTI) for all subordinate nodes; for the group sending method, after the subordinate node obtains an identifier initially, the group identifier may be updated continuously according to attribute changes of the subordinate node in subsequent operation;

Step 203: the resource reconfiguration module of the RBS and the subordinate node execute reconfiguration of spectrum resources according to the reconfiguration command;

specifically, the resource reconfiguration module and the subordinate node (UE or AP) of the RBS in a reconfiguration coverage area execute, according to a parameter in the reconfiguration command, reconfiguration of spectrum resources; during the reconfiguration, the spectrum resources are reconfigured to a target frequency band, communication is performed according to a limited transmitting parameter and limitation on the allowed working time is satisfied simultaneously.

Figure 3:
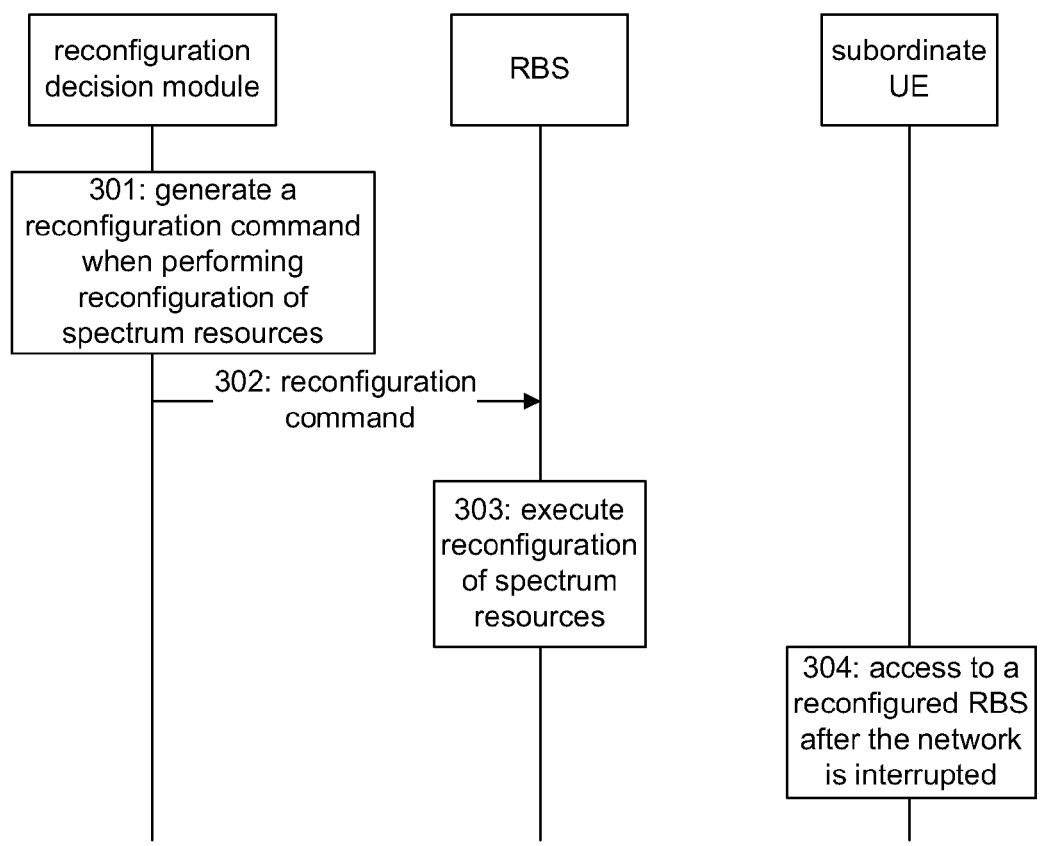
FIG. 3 is a flowchart of a third method for implementing reconfiguration of spectrum resources of a radio system according to an embodiment of the present disclosure.

FIG. 3 is a flowchart of the third method for implementing reconfiguration of spectrum resources of a radio system of an embodiment of the present disclosure. The method is applied to the scenario that a reconfiguration decision module is located in an upper layer of an RBS, but the RBS does not send a reconfiguration instruction to a subordinate node. As shown in FIG. 3, the method includes the following steps:

Step 301 to Step 302 are the same as Step 101 to Step 102;

Step 303: the RBS executes reconfiguration of spectrum resources according to a reconfiguration command;

specifically, after receiving the reconfiguration command, the RBS performs reconfiguration of spectrum resources according to a parameter in the reconfiguration command; during the reconfiguration, the spectrum resources are reconfigured to a target frequency band, communication is performed according to a limited transmitting parameter and limitation on the allowed working time is satisfied simultaneously; before the RBS executes reconfiguration of spectrum resources, the RBS does not notify a subordinate UE;

Step 304: the subordinate UE accesses to a reconfigured RBS after the network is interrupted;

specifically, since a UE working on the original frequency band will be disconnected after the RBS completes reconfiguration of spectrum resources, the network of the UE is interrupted; after the network is interrupted, the disconnected UE will search for a signal over again to access an RBS having completed reconfiguration of spectrum resources; this process is the same as a process that a UE accesses an RBS initially, which belongs to the prior art and will not be repeated here.

Figure 4:
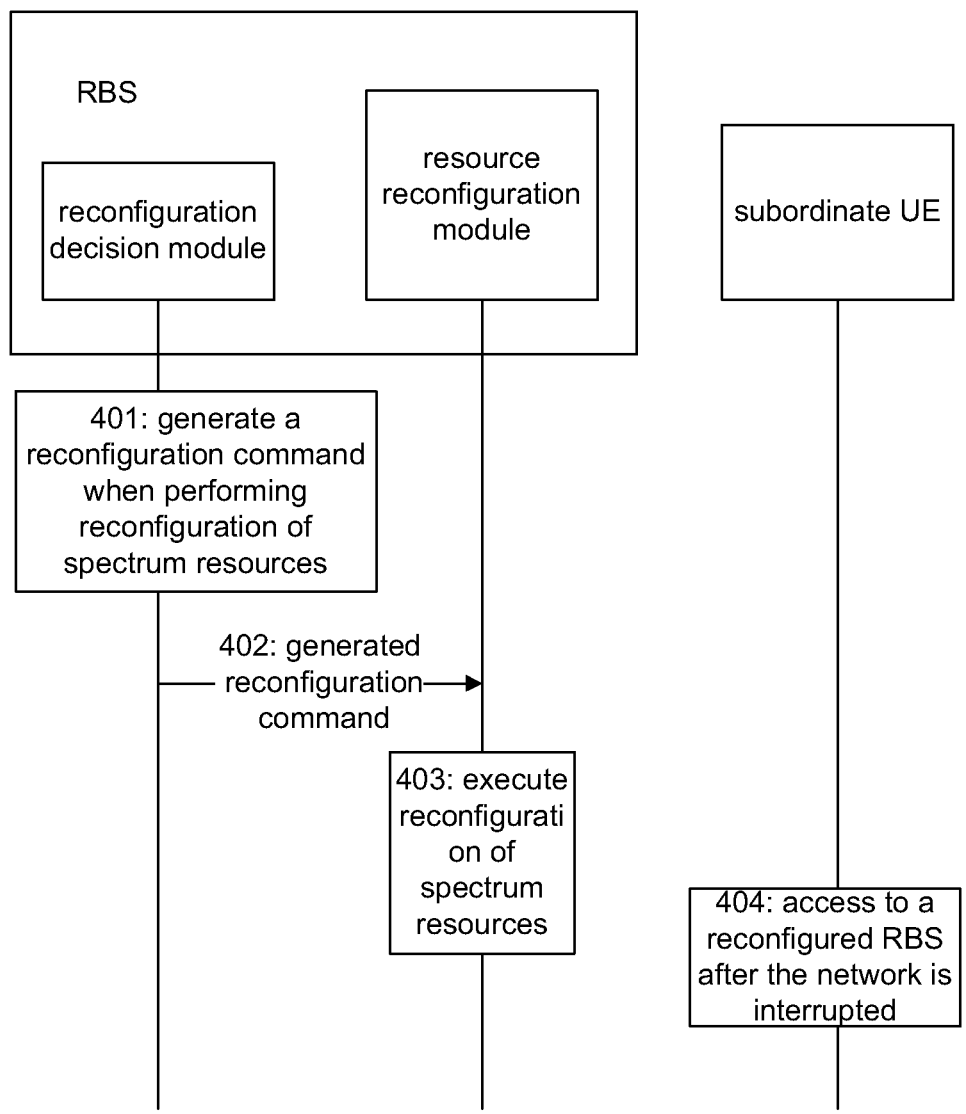
FIG. 4 is a flowchart of a fourth method for implementing reconfiguration of spectrum resources of a radio system according to an embodiment of the present disclosure.

FIG. 4 is a flowchart of the fourth method for implementing reconfiguration of spectrum resources of a radio system according to an embodiment of the present disclosure. The method is applied to the scenario that a reconfiguration decision module is located in an RBS, but the RBS does not send a reconfiguration instruction to a subordinate node. As shown in FIG. 4, the method includes the following steps:

Step 401 is the same as Step 201;

Step 402: a reconfiguration decision module of an RBS sends a generated reconfiguration command to a resource reconfiguration module of the RBS;

Step 403: the resource reconfiguration module of the RBS executes reconfiguration of spectrum resources according to the reconfiguration command;

specifically, after receiving the reconfiguration command, the resource reconfiguration module of the RBS performs reconfiguration of spectrum resources according to a parameter in the reconfiguration command; during the reconfiguration, the spectrum resources are reconfigured to a target frequency band, communication is performed according to a limited transmitting parameter and limitation on the allowed working time is satisfied simultaneously; before the RBS executes reconfiguration of spectrum resources, the RBS does not notify a subordinate UE;

Step 404: the subordinate UE accesses to a reconfigured RBS after the network is interrupted;

specifically, since a UE working on the original frequency band will be disconnected after the RBS complete reconfiguration of spectrum resources, the network of the UE is interrupted; after the network is interrupted, the disconnected UE will search for a signal over again to access an RBS having completed reconfiguration of spectrum resources; this process is the same as a process that a UE accesses an RBS initially, which belongs to the prior art and will not be repeated here.

In the embodiments of the present disclosure, the reconfiguration decision module is a logical or physical entity having a reconfiguration decision function to make a reconfiguration decision when reconfiguration of spectrum resources is triggered, generate a reconfiguration command and send the reconfiguration command to a designated network element. Preferably, the reconfiguration module may be a Central Control Point (CCP) in European Telecommunications Standards Institute (ETSI) Reconfigurable Radio Systems (RRS) standards, or a Reconfiguration Entity (RE), or an advanced geolocation engine, or a Spectrum Manager (SM) in Institute of Electrical and Electronics Engineers (IEEE) 802.22 standards. The AP may be a network node such as a relay node, and may be connected with an RBS by a backhaul link.

Embodiment 1

Figure 5:
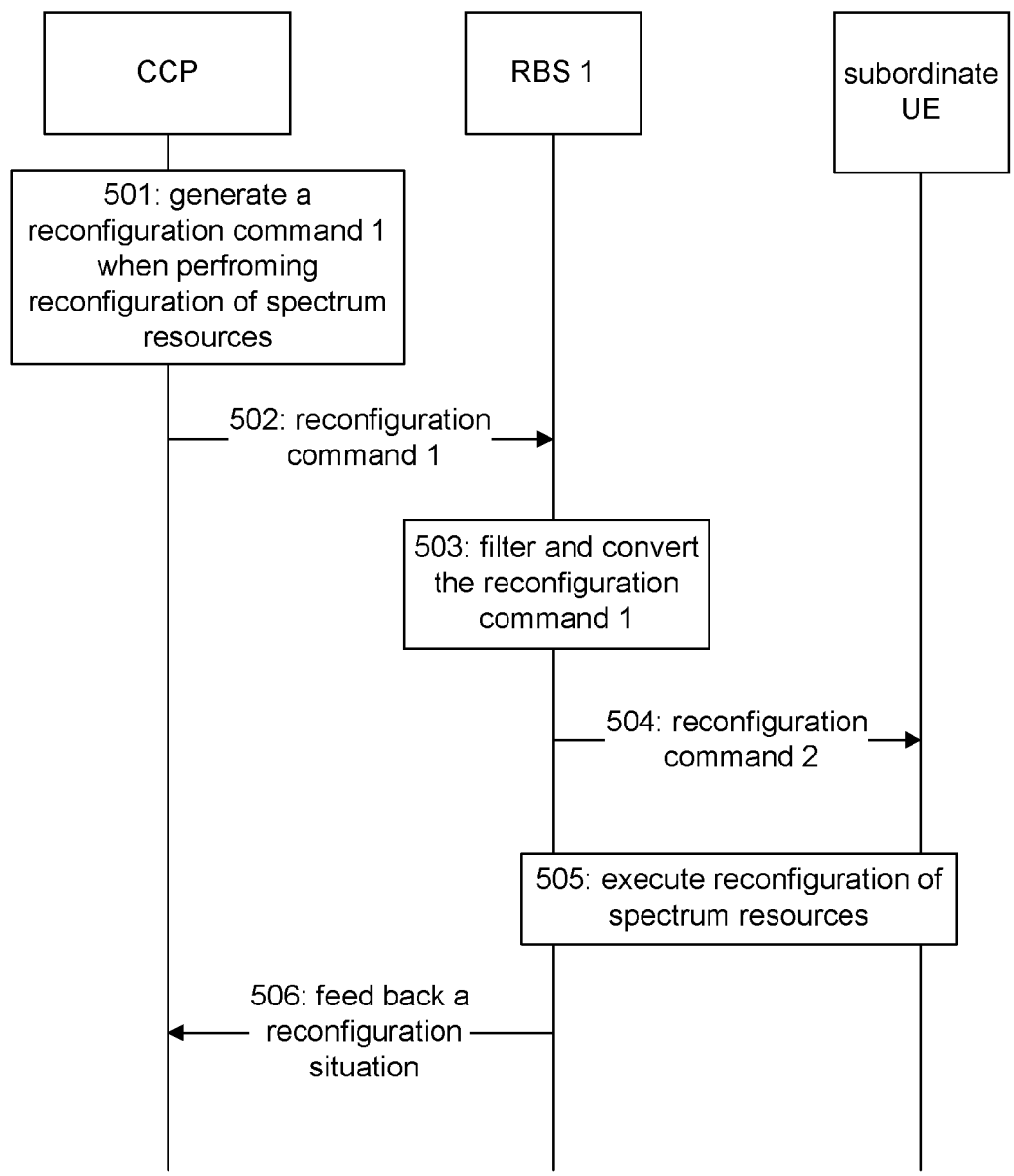
FIG. 5 is a flowchart of a first embodiment illustrating implementation of a spectrum resource reconfiguration method of a radio system according to an embodiment of the present disclosure.

FIG. 5 is a flowchart of the first embodiment illustrating implementation of a spectrum resource reconfiguration method of a radio system according to an embodiment of the present disclosure. The method is a specific embodiment for accordingly implementing the first spectrum resource reconfiguration method of a radio system and is applied to the scenario that a reconfiguration decision module is located in an upper layer of an RBS and reconfiguration of spectrum resources is performed for an access link in a radio system. In the present embodiment, the reconfiguration decision module is a CCP. As shown in FIG. 5, the method includes the following steps:

Step 501: when reconfiguration of spectrum resources is triggered, generate, by a CCP, a reconfiguration command 1;

specifically, reconfiguration of spectrum resources can be triggered in the case of appearance of a main user, configuration of OAM, a request of an adjacent reconfiguration decision module and an idle spectrum resource application sent by an RBS; in the present embodiment, a related RBS and a subordinate UE are triggered to perform reconfiguration of spectrum resources when a main user to which a spectrum resource f1 occupied by a secondary system appears, wherein the appearance of the main user means that the main user will reuse the spectrum resource f1 originally borrowed by the secondary system, which can be sensed, measured and discovered by a CCP subordinate node and notified to the CCP, or may be also notified to the CCP by a main user spectrum use situation database;

the CCP runs a reconfiguration algorithm according to a reason that triggers reconfiguration of spectrum resources to generate a reconfiguration decision and then generates a reconfiguration command according to the reconfiguration decision; the reconfiguration command carries a reconfiguration command sending parameter; the reconfiguration command sending parameter includes parameters including reconfiguration time, a reconfiguration target frequency band, transmitting parameter limitation of the target frequency band, allowed working time, a reconfiguration coverage area etc.; here, when the CCP runs the reconfiguration algorithm, in order to form a parameter required by the reconfiguration command, related information may be obtained in a database, e.g. the database will provide a range involved in the reconfiguration etc.;

the reconfiguration time is configured to specify a time limitation of completing reconfiguration; in the present embodiment, the CCP requires RBS1 to complete reconfiguration required by the reconfiguration command 1 within 5 s; the reconfiguration target frequency band refers a spectrum resource that needs to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on the target frequency band, e.g. the allowed working time is specified to be 2 h; 2 h later, a reconfiguration system needs to acknowledge, through sensing or accessing the database, whether to continue to use the target frequency band, or the target frequency band is exited directly; the reconfiguration coverage area refers to a reconfiguration area involved by the reconfiguration command and is configured to determine a range of subordinate nodes involved in reconfiguration;

Step 502: the CCP sends the reconfiguration command 1 to subordinate RBS1 related to the reconfiguration of the spectrum resources;

specifically, the CCP sends the reconfiguration command 1 to subordinate RBS1 related to the reconfiguration of the spectrum resources; when the reconfiguration decision module sends the reconfiguration command to the RBS, the reconfiguration command is sent separately;

the CCP determines, according to the range involved in the reconfiguration and provided by the database, that the reconfiguration of the spectrum resources involves RBS1 in subordinate RBS1 to RBS5, thus determining to send the reconfiguration command 1 separately; the separate sending method refers to sending the reconfiguration command to a certain subordinate node by a point-to-point (CCP-to-RBS1) separate sending method, e.g. when the CCP sends the reconfiguration command to the RBS, the reconfiguration command only involves RBS1, then the separate sending method is applied and the CCP sends the reconfiguration command to RBS1 separately;

Step 503: RBS1 filters and converts the received reconfiguration command 1;

specifically, RBS1 filters and converts the received reconfiguration command 1, and converts a parameter involving a reconfiguration operation of a subordinate UE in the reconfiguration command 1 into a reconfiguration command 2 recognizable by the subordinate UE;

for example, in the reconfiguration time, the reconfiguration target frequency band, the transmitting parameter limitation of the target frequency band, the allowed working time, and the reconfiguration coverage area contained in the reconfiguration command 1, two parameters including the allowed working time and the reconfiguration coverage area are applied to reconfiguration control of RBS1 and do not need to be sent to the subordinate UE; therefore, the reconfiguration command 2 does not need to include these two parameters; at the same time, RBS1 converts other parameters into formats recognizable by the subordinate UE to form the reconfiguration command 2;

in the present embodiment, since the main user on f1 appears, all UEs working on f1 need to be reconfigured to target spectrums; when a subordinate UE of RBS1 accesses a network initially, RBS1 has grouped each UE according to working spectrums thereof; those working on f1 are defined as group 1 and have the same group identifier; therefore, when RBS1 sends the reconfiguration command 2 to UEs in the group, a UE working on f1 can be found according to the group identifier, and a subordinate UE in group 1 can be controlled to perform reconfiguration of spectrum resources according to the reconfiguration command 2;

Step 504: RBS1 sends the reconfiguration command 2 to a subordinate UE;

specifically, RBS1 sends the reconfiguration command 2 to the subordinate UE; methods for sending the reconfiguration command 2 include one or more of the followings: a separate sending method, a group sending method, and a unified sending method; according to the range of the reconfiguration coverage area in the reconfiguration command provided by the CCP, RBS1 determines that the reconfiguration of the spectrum resources involves all subordinate UEs of itself working on f1, thus determining to send the reconfiguration command 2 by the group sending method; the group sending method means that the reconfiguration command is sent by a point-to-multipoint (RBS1-to UEs working on f1) to the subordinate UEs working on f1; reconfiguration command sending parameter carried in the sent reconfiguration command includes: reconfiguration time, a reconfiguration target frequency band, and transmitting parameter limitation of the target frequency band;

Step 505: RBS1 and the subordinate UE execute reconfiguration of spectrum resources according to the reconfiguration command;

specifically, RBS1 and the subordinate UE execute reconfiguration of spectrum resources according to the parameter in the reconfiguration command; during reconfiguration, a spectrum resource is reconfigured to a target frequency band, and communication is performed according to a limited transmitting parameter and limitation on the allowed working time is satisfied simultaneously;

Step 506: RBS1 and the subordinate UE complete reconfiguration of spectrum resources, and after establishing a normal communication link, RBS1 feeds back a reconfiguration situation to the CCP, wherein in the feedback, RBS1 notifies the CCP whether the reconfiguration is successful, and an actual working parameter after successful reconfiguration.

Embodiment 2

Figure 6:
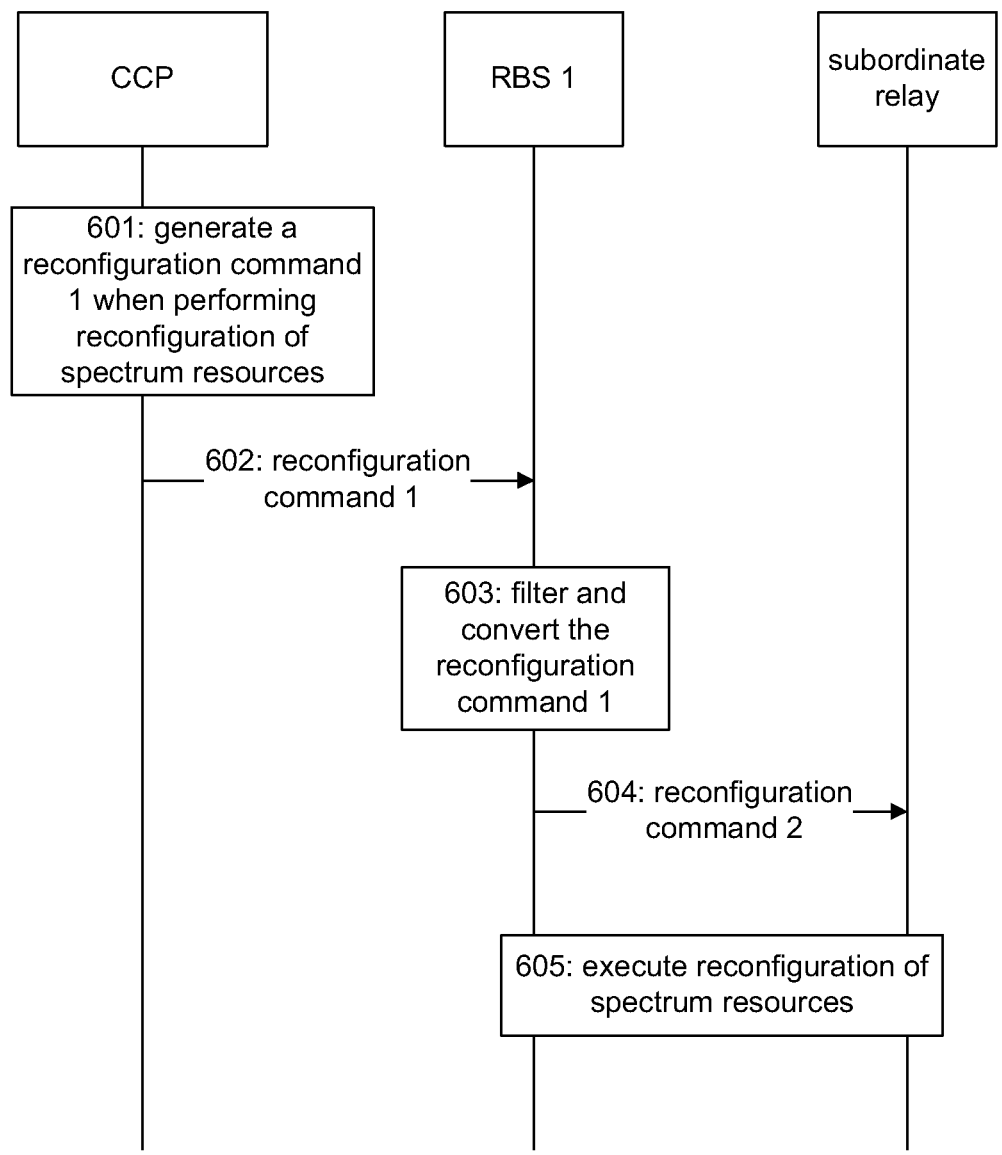
FIG. 6 is a flowchart of a second embodiment illustrating implementation of a spectrum resource reconfiguration method of a radio system according to an embodiment of the present disclosure.

FIG. 6 is a flowchart of the second embodiment illustrating implementation of a spectrum resource reconfiguration method of a radio system according to an embodiment of the present disclosure. The method is a specific embodiment for implementing the first spectrum resource reconfiguration method of a radio system and is applied to the scenario that a reconfiguration decision module is located in an upper layer of an RBS and reconfiguration of spectrum resources is performed for a backhaul link in a radio system. In the present embodiment, the reconfiguration decision module is a CCP. As shown in FIG. 6, the method includes the following steps:

Step 601: when reconfiguration of spectrum resources is triggered, a CCP generates a reconfiguration command 1;

specifically, reconfiguration of spectrum resources can be triggered in the case of appearance of a main user, configuration of OAM, a request of an adjacent reconfiguration decision module and an idle spectrum resource application sent by an RBS; in the present embodiment, RBS1 is overloaded and sends an idle spectrum resource application to the CCP;

the CCP runs a reconfiguration algorithm according to a reason that triggers reconfiguration of spectrum resources to generate a reconfiguration decision and then generates a reconfiguration command according to the reconfiguration decision; the reconfiguration command carries a reconfiguration command sending parameter; the reconfiguration command sending parameter includes parameters including reconfiguration time, a reconfiguration target frequency band, transmitting parameter limitation of the target frequency band, allowed working time, a reconfiguration coverage area etc.;

the reconfiguration time is configured to specify a time limitation of completing reconfiguration; in the present embodiment, the CCP requires RBS1 to complete reconfiguration required by the reconfiguration command 1 within 5 s; the reconfiguration target frequency band refers a spectrum resource that needs to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on the target frequency band, e.g. the allowed working time is specified to be 2 h; 2 h later, a reconfiguration system needs to acknowledge, through sensing or accessing the database, whether to continue to use the target frequency band, or the target frequency band is exited directly; the reconfiguration coverage area refers to a reconfiguration area involved by the reconfiguration command and is configured to determine a range of subordinate nodes involved in reconfiguration;

Step 602: the CCP sends the reconfiguration command 1 to subordinate RBS1 related to the reconfiguration of the spectrum resources;

specifically, the CCP sends the reconfiguration command 1 to RBS1 related to the reconfiguration of the spectrum resources; when the reconfiguration decision module sends the reconfiguration command to the RBS, the reconfiguration command is sent separately;

since the reconfiguration of the spectrum resources only involves reconfiguration of spectrum resources of RBS1 and an RBS1 subordinate node, it is determined that the reconfiguration command is sent separately; the separate sending method refers to sending the reconfiguration command to a certain subordinate node by a point-to-point (CCP-to-RBS1) separate sending method, e.g. when the reconfiguration decision module sends the reconfiguration command to the RBS, the reconfiguration command only involves a certain RBS, then the separate sending method is applied, i.e. the reconfiguration sending module sends the reconfiguration command to the RBS separately;

Step 603: RBS1 filters and converts the received reconfiguration command 1;

specifically, RBS1 filters and converts the received reconfiguration command 1, and converts a parameter involving a reconfiguration operation of a subordinate node in the reconfiguration command 1 into a reconfiguration command 2 recognizable by the subordinate node;

after determining a subordinate node that needs to be reconfigured, RBS1 determines to configure a backhaul link between a subordinate relay of RBS1 and RBS1 to a newly-acquired target frequency band to spare the original frequency band for an access link, thus relieving the overload and spectrum resource shortage of the access link;

for example, in the reconfiguration time, the reconfiguration target frequency band, the transmitting parameter limitation of the target frequency band and the allowed working time contained in the reconfiguration command 1, the parameter-allowed working time is applied to spectrum resource reconfiguration control by the RBS and does not need to be sent to a subordinate relay; therefore, the reconfiguration command 2 does not need to include this parameter; RBS1 converts other three parameters into formats recognizable by the relay to generate the reconfiguration command 2;

Step 604: RBS1 sends the reconfiguration command 2 to a subordinate relay;

specifically, RBS1 sends the reconfiguration command 2 to the subordinate relay; methods for sending the reconfiguration command 2 include one or more of the followings: a separate sending method, a group sending method, and a unified sending method;

according to the range of the reconfiguration coverage area in the reconfiguration command provided by the CCP, RBS1 determines that the reconfiguration of the spectrum resources involves subordinate relay 1, relay 2, and relay 3 thereof; however, since relay 1, relay 2 and relay 3 have different position ranges, different reconfiguration command sending methods are applied; these three relays are divided into two groups, relay 1 in one group separately, and relay 2 and relay 3 in the other; the reconfiguration command is sent by a method combining the separate sending method and the group sending method, i.e. RBS1 sends the reconfiguration command 2 to relay 1 separately and sends the reconfiguration command 2 to the group of relay 2 and relay 3, wherein the reconfiguration command 2 includes: reconfiguration time, a reconfiguration target frequency band, and transmitting parameter limitation of the target frequency band;

in the present embodiment, when subordinate relays of RBS1 access a network initially, RBS1 has grouped the subordinate relays according to geographic locations; relay 2 and relay 3 are defined as group 1 and have the same group identifier; therefore, when RBS1 sends the reconfiguration command 2 to the relays in this group, all relays in the area can be found according to the group identifier and the relays are controlled to perform spectrum resource reconfiguration according to the reconfiguration command 2;

in the present embodiment, a combined sending method consisting of the separate sending method and the group sending method is applicable. The separate sending method and the unified sending method, the group sending method and the unified sending method, the separate sending method and the separate sending method, the group sending method and the group sending method may be combined to perform sending according to different scenarios;

Step 605: RBS1 and the subordinate relay execute reconfiguration of spectrum resources according to the reconfiguration command;

specifically, RBS1 and the subordinate relay execute, according to a parameter in the reconfiguration command, reconfiguration of spectrum resources; during reconfiguration, a spectrum resource is reconfigured to a target frequency band, and communication is performed according to a limited transmitting parameter and limitation on the allowed working time is satisfied simultaneously;

in the present embodiment, the CCP does not require RBS1 to feed back a reconfiguration situation after reconfiguration; therefore, there is no feedback information from RBS1 after successful reconfiguration.

Embodiment 3

Figure 7:
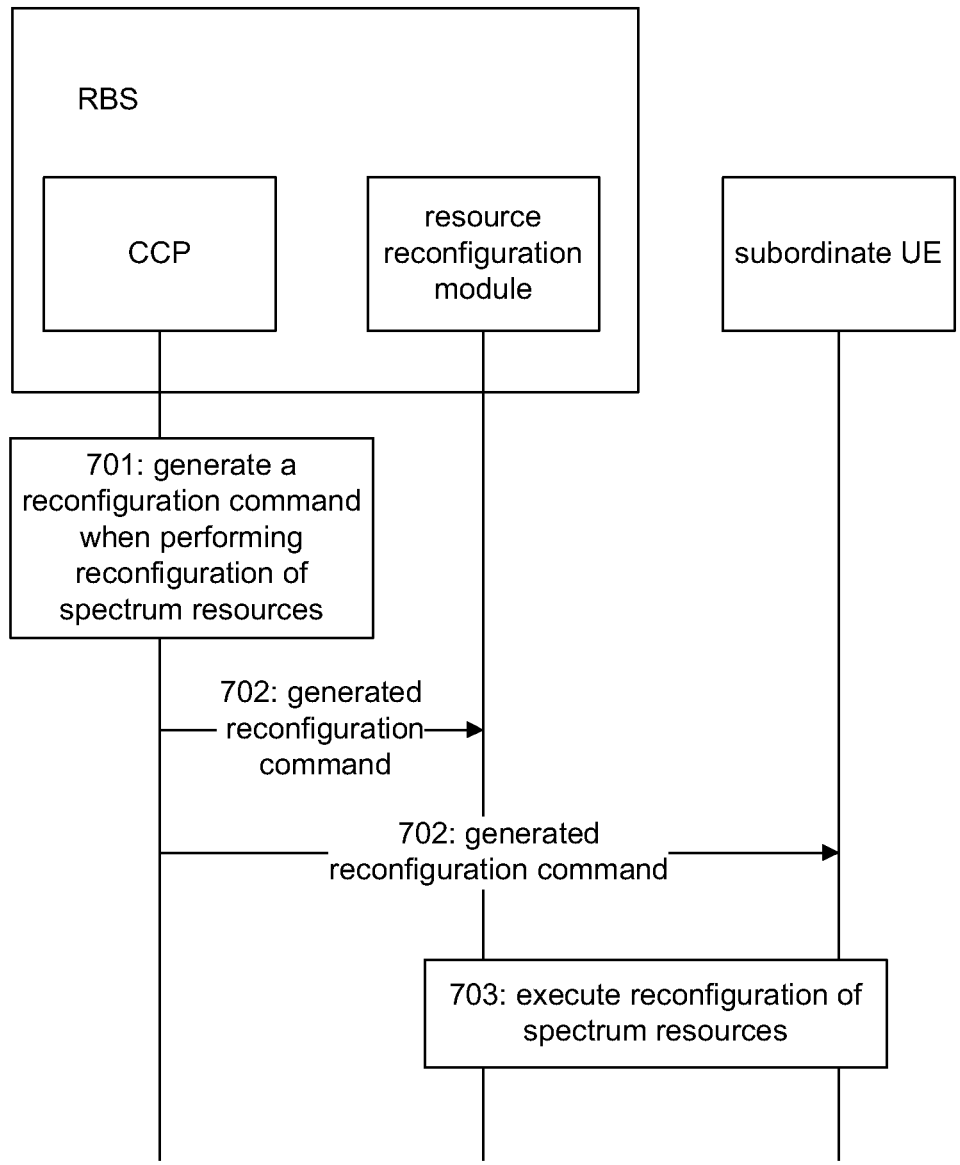
FIG. 7 is a flowchart of the third embodiment illustrating implementation of a spectrum resource reconfiguration method of a radio system according to an embodiment of the present disclosure.

FIG. 7 is a flowchart of the third embodiment illustrating implementation of a spectrum resource reconfiguration method of a radio system according to an embodiment of the present disclosure. The method is a specific embodiment for implementing the second spectrum resource reconfiguration method of a radio system and is applied to the scenario that a reconfiguration decision module is located in an RBS and reconfiguration of spectrum resources is performed based on a UE working spectrum group. In the present embodiment, the reconfiguration decision module is a CCP. As shown in FIG. 7, the method includes the following steps:

Step 701: when reconfiguration of spectrum resources is triggered, a CCP of an RBS generates a reconfiguration command;

specifically, reconfiguration of spectrum resources can be triggered in the case of appearance of a main user, configuration of OAM, a request of an adjacent reconfiguration decision module and idle spectrum resource application sent by an RBS; in the present embodiment, a related RBS and a subordinate UE are triggered to perform reconfiguration of spectrum resources when a main user to which a spectrum resource f1 occupied by a secondary system appears, wherein the appearance of the main user means that the main user will reuse the spectrum resource f1 originally borrowed by the secondary system, which can be sensed, measured and discovered by a CCP subordinate node and notified to the CCP, or may be also notified to the CCP by a main user spectrum use situation database;

in the present embodiment, the CCP is located in the RBS; the CCP runs a reconfiguration algorithm according to a reason that triggers reconfiguration of spectrum resources to generate a reconfiguration decision and then generates a reconfiguration command according to the reconfiguration decision; the reconfiguration command includes a parameter including reconfiguration time, a reconfiguration target frequency band, transmitting parameter limitation of the target frequency band, allowed working time, a reconfiguration coverage area etc.; the reconfiguration time is configured to specify a time limitation of completing reconfiguration; in the present embodiment, the CCP requires RBS1 to complete reconfiguration required by the reconfiguration command 1 within 5 s; the reconfiguration target frequency band refers a spectrum resource that needs to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on the target frequency band, e.g. the allowed working time is specified to be 2 h; 2 h later, a reconfiguration system needs to acknowledge, through sensing or accessing the database, whether to continue to use the target frequency band, or the target frequency band is exited directly; the reconfiguration coverage area refers to a reconfiguration area involved by the reconfiguration command and is configured to determine a range of subordinate nodes involved in reconfiguration;

when the CCP runs the reconfiguration algorithm, in order to form a parameter required by the reconfiguration command, related information needs to be obtained in a database sometimes, e.g. a range involved in the reconfiguration and the database will provide the information;

Step 702: the CCP of the RBS sends the generated reconfiguration command to a subordinate UE related to the reconfiguration and a resource reconfiguration module of the RBS;

specifically, the CCP of the RBS sends the generated reconfiguration command to the subordinate UE related to the reconfiguration and the resource reconfiguration module of the RBS; when the CCP sends the reconfiguration command to the subordinate UE related to the reconfiguration, methods for sending the reconfiguration command include one or more of the followings: a separate sending method, a group sending method and a unified sending method;

According to the range of the reconfiguration coverage area in the reconfiguration command provided by the CCP, RBS1 determines that the reconfiguration of the spectrum resources involves all subordinate UEs, thus determining to send the reconfiguration command by the unified sending method; the unified sending method means that the reconfiguration command is sent by a point-to-multipoint (RBS1-to all UEs) to the subordinate UEs; the reconfiguration command is added to a system broadcasting message and sent to all UEs; since in the parameters including the reconfiguration time, the reconfiguration target frequency band, the transmitting parameter limitation of the target frequency band, the allowed working time, and the reconfiguration coverage area etc., the allowed working time and the reconfiguration coverage area are configured to perform reconfiguration control by the RBS, the two parameters do not need to sent to the subordinate UE; therefore, the reconfiguration command sent by the CCP to the subordinate UE related to the reconfiguration only includes the reconfiguration time, the reconfiguration target frequency band and the transmitting parameter limitation of the target frequency band;

in the present embodiment, since the main user on f1 appears, all UEs working on f1 need to be reconfigured to target spectrums; when a subordinate UE of RBS1 accesses a network initially, RBS1 has allocate a unified identifier for each UE; the identifier may be an SI-RNTI in existing standards, and may be also an identifier redefined for reconfiguration; therefore, when RBS1 sends the reconfiguration command to all UEs, a UE working on f1 can be found according to the group identifier, and the UE working on f1 is controlled to perform reconfiguration of spectrum resources according to the reconfiguration command;

Step 703: the resource reconfiguration module of the RBS and the subordinate UE related to the reconfiguration execute reconfiguration of spectrum resources according to the reconfiguration command;

specifically, the resource reconfiguration module of the RBS and the subordinate UE related to the reconfiguration execute, according to the parameter in the reconfiguration command, reconfiguration of spectrum resources; during reconfiguration, a spectrum resource is reconfigured to a target frequency band, and communication is performed according to a limited transmitting parameter and limitation on the allowed working time is satisfied simultaneously.

Embodiment 4

Figure 8:
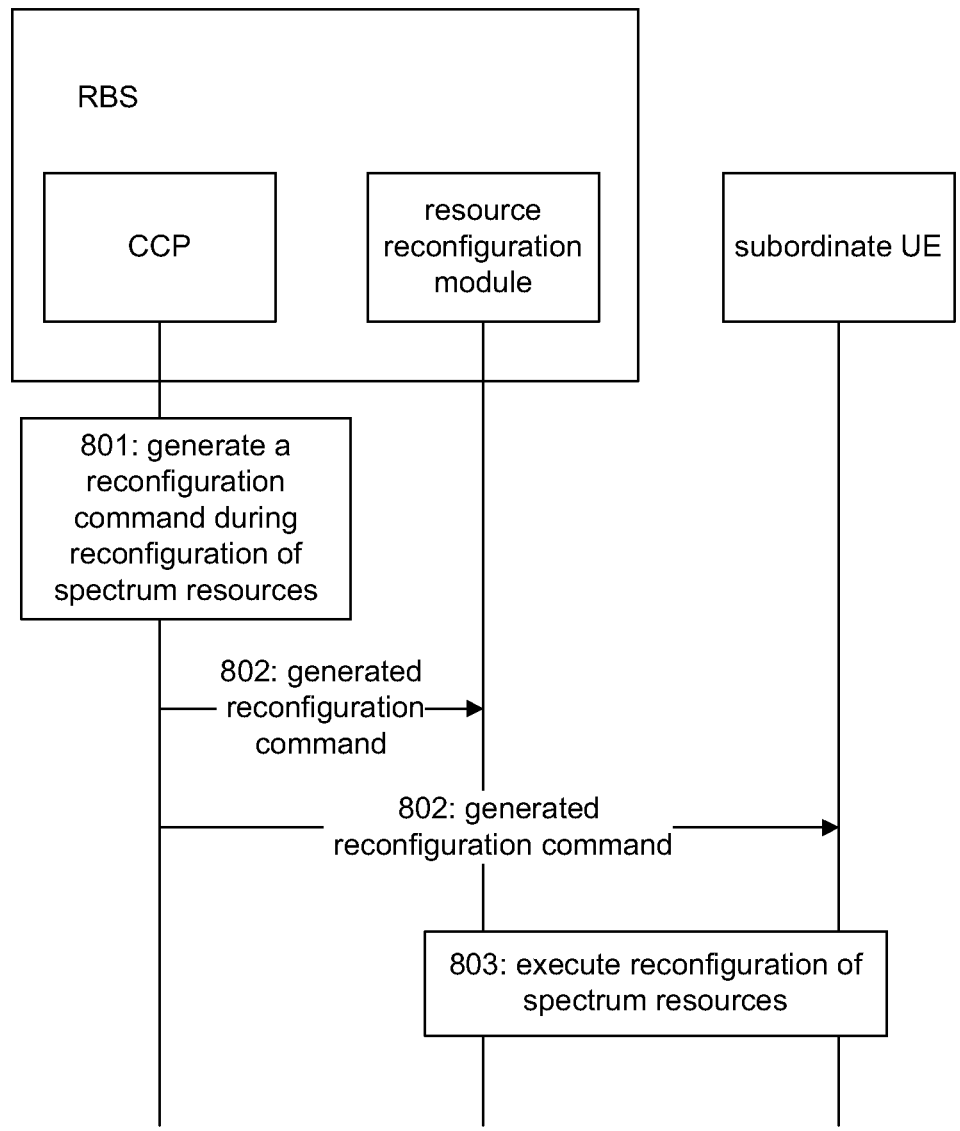
FIG. 8 is a flowchart of the fourth embodiment illustrating implementation of a spectrum resource reconfiguration method of a radio system according to an embodiment of the present disclosure.

FIG. 8 is a flowchart of the fourth embodiment illustrating implementation of a spectrum resource reconfiguration method of a radio system of an embodiment of the present disclosure. The method is a specific embodiment for accordingly implementing the second spectrum resource reconfiguration method of the radio system and is applied to the scenario that a reconfiguration decision module is located in an RBS and reconfiguration of spectrum resources is performed based on a UE service attribute group. In the present embodiment, the reconfiguration decision module is a CCP. As shown in FIG. 8, the method includes the following steps:

Step 801: when reconfiguration of spectrum resources is triggered, a CCP of an RBS generates a reconfiguration command;

specifically, reconfiguration of spectrum resources can be triggered in the case of appearance of a main user, configuration of OAM, a request of an adjacent reconfiguration decision module and idle spectrum resource application sent by an RBS; in the present embodiment, the RBS is overloaded and sends an idle spectrum resource application to the CCP;

the CCP runs a reconfiguration algorithm according to a reason that triggers reconfiguration of spectrum resources to generate a reconfiguration decision and then generates a reconfiguration command according to the reconfiguration decision; the reconfiguration command carries a reconfiguration command sending parameter; the reconfiguration command sending parameter includes parameters including reconfiguration time, a reconfiguration target frequency band, transmitting parameter limitation of the target frequency band, allowed working time, a reconfiguration coverage area etc.; the reconfiguration time is configured to specify a time limitation of completing reconfiguration; in the present embodiment, the CCP requires RBS1 to complete reconfiguration required by the reconfiguration command 1 within 5 s; the reconfiguration target frequency band refers a spectrum resource that needs to be reconfigured; the parameter may be represented by a central frequency point and a bandwidth, or an initial frequency and an end frequency of a frequency band, e.g. central frequency point=f1=514 MHz and bandwidth 8M, or initial frequency f2=510 MHz and end frequency f3=518 MHz; the transmitting parameter limitation of the target frequency band refers to limitation on transmission power and/or on the height, direction and angle of pitch of a transmitting antenna, e.g. the transmitting power is smaller than or equal to 50 w; the allowed working time refers to the working time allowed on the target frequency band, e.g. the allowed working time is specified to be 2 h; 2 h later, it needs to acknowledge, through sensing or accessing the database, whether to continue to use the target frequency band, or the target frequency band is exited directly; the reconfiguration coverage area refers to a reconfiguration area involved by the reconfiguration command and is configured to determine a range of subordinate nodes involved in reconfiguration;

Step 802: the CCP of the RBS sends the generated reconfiguration command to a subordinate UE related to the reconfiguration of the spectrum resources and a resource reconfiguration module of the RBS;

specifically, the CCP of the RBS firstly determines a UE that needs to perform reconfiguration of spectrum resources and determines to reconfigure a subordinate UE running a voice service to a target frequency band to relieve the overload of the RBS and the shortage of spectrum resources; in the present embodiment, when subordinate UEs of the RBS establish Radio Resource Control (RRC) connections initially, the RBS have grouped the UEs according to services thereof; UEs having voice services are defined as group 1; the UEs in group 1 have the same group identifier; the identifier may be configured together with a C-RNTI of an UE, i.e. when a UE has a service, a C-RNTI and the group identifier is allocated to the UE; the group identifier may be also the C-RNTI of the UE; the UE enters an RRC_CONNECTED state; therefore, when the RBS sends the reconfiguration command to the UEs in group 1, all UEs having a voice service can be found according to the group identifier, and all UEs having a voice service are controlled to perform reconfiguration of spectrum resources according to the reconfiguration command; when a service of a UE changes, the group thereof is also updated to a new corresponding group;

specifically, the CCP of the RBS sends the generated reconfiguration command to the subordinate UE related to the reconfiguration and the resource reconfiguration module of the RBS; when the CCP sends the reconfiguration command to the subordinate UE related to the reconfiguration, methods for sending the reconfiguration command include one or more of the followings: a separate sending method, a group sending method and a unified sending method; through determining the UEs which need to perform reconfiguration of spectrum resources, the reconfiguration command is sent to all UEs in group 1; therefore the group sending method is applied; since in the parameters including the reconfiguration time, the reconfiguration target frequency band, the transmitting parameter limitation of the target frequency band, the allowed working time, and the reconfiguration coverage area etc., the allowed working time and the reconfiguration coverage area are configured to perform reconfiguration control by the RBS, the two parameters do not need to sent to the subordinate UE; therefore, the reconfiguration command sent by the CCP to the subordinate UE related to the reconfiguration only includes the reconfiguration time, the reconfiguration target frequency band and the transmitting parameter limitation of the target frequency band;

Step 803: the resource reconfiguration module of the RBS and the subordinate UE related to the reconfiguration execute reconfiguration of spectrum resources according to the reconfiguration command;

specifically, the resource reconfiguration module of the RBS1 and the subordinate UE related to the reconfiguration execute, according to the parameter in the reconfiguration command, reconfiguration of spectrum resources; during reconfiguration, a spectrum resource is reconfigured to a target frequency band, and communication is performed according to a limited transmitting parameter and limitation on the allowed working time is satisfied simultaneously;

in the third embodiment and the fourth embodiment, the RBS may also group the UEs according to the access time, specifically, when subordinate UEs of the RBS establish RRC connections initially, the RBS has grouped the subordinate UEs according to the access time thereof, e.g. UEs accessed between 4 o'clock and 10 o'clock are defined as group 1 and UEs accessed between 10 o'clock and 16 o'clock are defined as group 2; UEs in the same group are provided with the same group identifier; therefore, when the RBS sends the reconfiguration command to a UE in a certain group, all UEs in the group can be found according to the group identifier and all UEs in the group are controlled to perform reconfiguration of spectrum resources according to the reconfiguration command.

Figure 9:
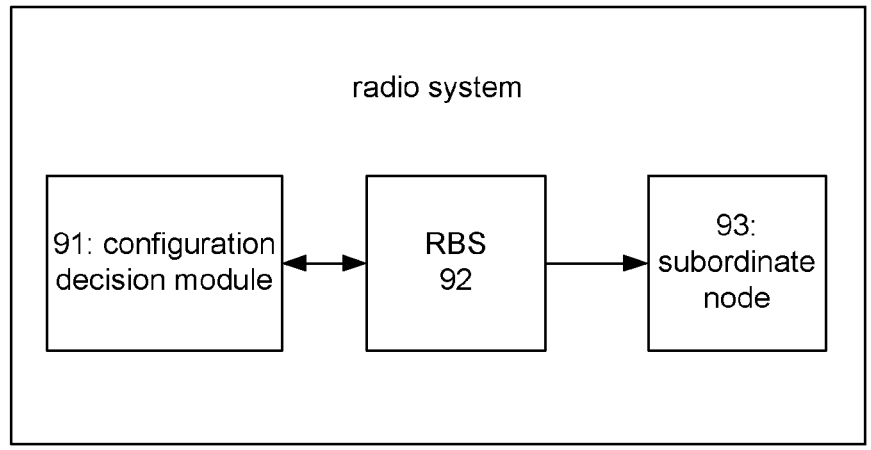
FIG. 9 is a structural diagram of the first embodiment illustrating implementation of a radio system according to an embodiment of the present disclosure.

To realize the methods above, an embodiment of the present disclosure further provides a radio system corresponding to the first method of reconfiguration of spectrum resources of a radio system. FIG. 9 is a structural diagram of the first embodiment illustrating implementation of a radio system of an embodiment of the present disclosure. As shown in FIG. 9, the system includes: a reconfiguration decision module 91, an RBS 92 and a subordinate node 93, wherein the reconfiguration decision module 91 is configured to, when reconfiguration of spectrum resources is triggered, generate a reconfiguration command, and send the reconfirmation command to a subordinate RBS 92 related to the reconfiguration of the spectrum resources;

the RBS 92 is configured to send the received reconfiguration command to the subordinate node 93 and is further configured to execute, according to the reconfiguration command, reconfiguration of spectrum resources;

the subordinate node 93 is configured to execute reconfiguration of spectrum resources according to the reconfiguration command;

wherein the RBS 92 is further configured to, before sending the received reconfiguration command to the subordinate node, send a feedback acknowledgement message to the reconfiguration decision module 91, and/or the RBS 92 is further configured to, after executing the reconfiguration of the spectrum resources, feed back a reconfiguration situation to the reconfiguration decision module 91.

Figure 10:
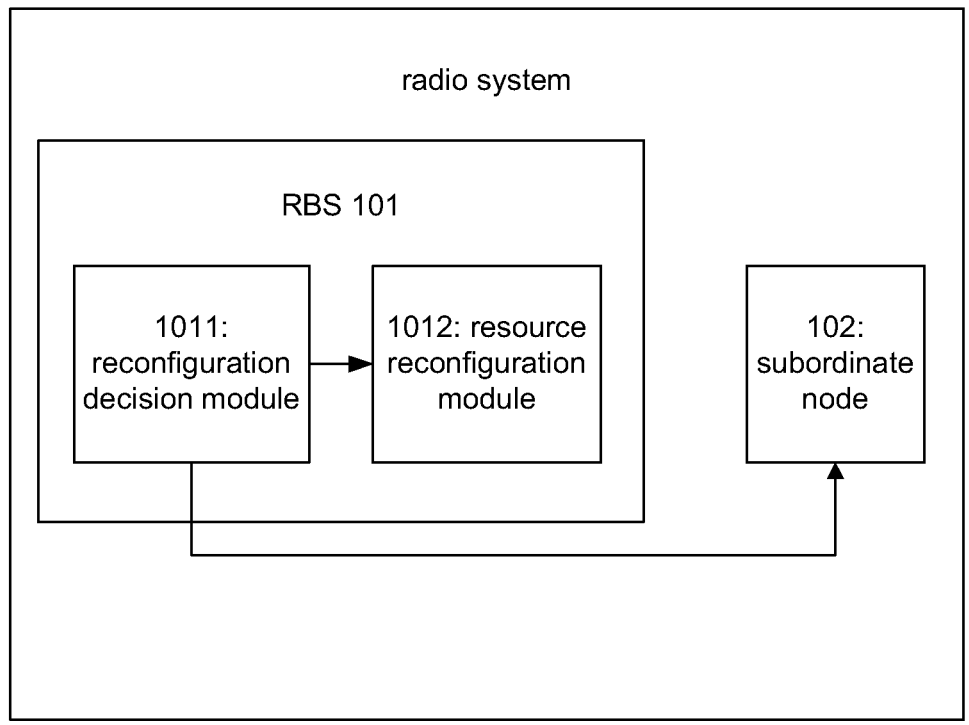
FIG. 10 is a structural diagram of a second embodiment illustrating implementation of a radio system according to an embodiment of the present disclosure.

An embodiment of the present disclosure further provides a radio system corresponding to the second method of reconfiguration of spectrum resources of a radio system. FIG. 10 is a structural diagram of the second embodiment illustrating implementation of a radio system according to an embodiment of the present disclosure. As shown in FIG. 10, the system includes: an RBS 101 and a subordinate node 102; the RBS 101 further includes a reconfiguration decision module 1011 and a resource reconfiguration module 1012, wherein the reconfiguration decision module 1011 is configured to, when reconfiguration of spectrum resources is triggered, generate a reconfiguration command, and send the reconfiguration command to the subordinate node 102 and the resource reconfiguration module 1012;

the resource reconfiguration module 1012 is configured to execute the reconfiguration of the spectrum resources according to the reconfiguration command;

the subordinate node 102 is configured to execute the reconfiguration of the spectrum resources according to the reconfiguration command.

Figure 11:
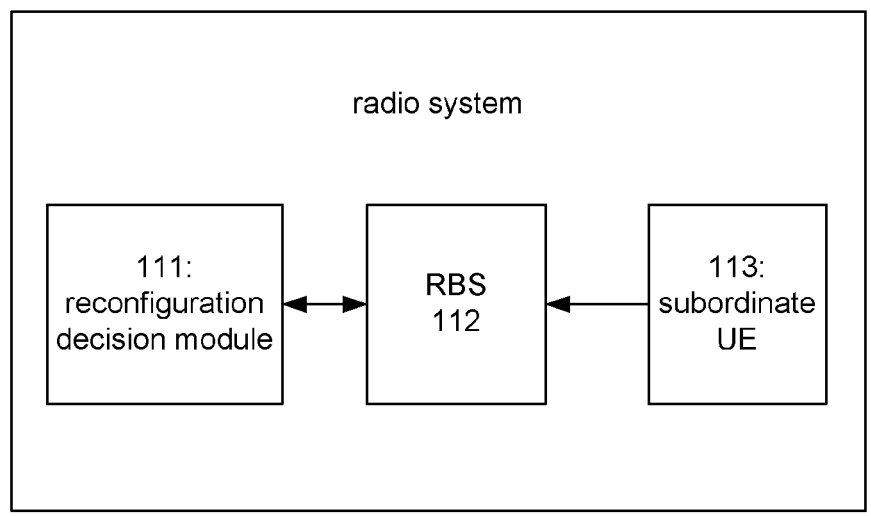
FIG. 11 is a structural diagram of a third embodiment illustrating implementation of a radio system according to an embodiment of the present disclosure.

An embodiment of the present disclosure further provides a radio system corresponding to the third method of reconfiguration of spectrum resources of a radio system. FIG. 11 is a structural diagram of the third embodiment illustrating implementation of a radio system of an embodiment of the present disclosure. As shown in FIG. 11, the system includes: a reconfiguration decision module 111, an RBS 112 and a subordinate UE 113, wherein the reconfiguration decision module 111 is configured to, when reconfiguration of spectrum resources is triggered, generate a reconfiguration command, and send the reconfirmation command to a subordinate RBS 112 related to the reconfiguration of the spectrum resources;

the RBS 112 is configured to execute reconfiguration of spectrum resources according to a reconfiguration command;

the subordinate UE 113 is configured to connect, when the network is interrupted, to a reconfigured RBS 112.

Figure 12:
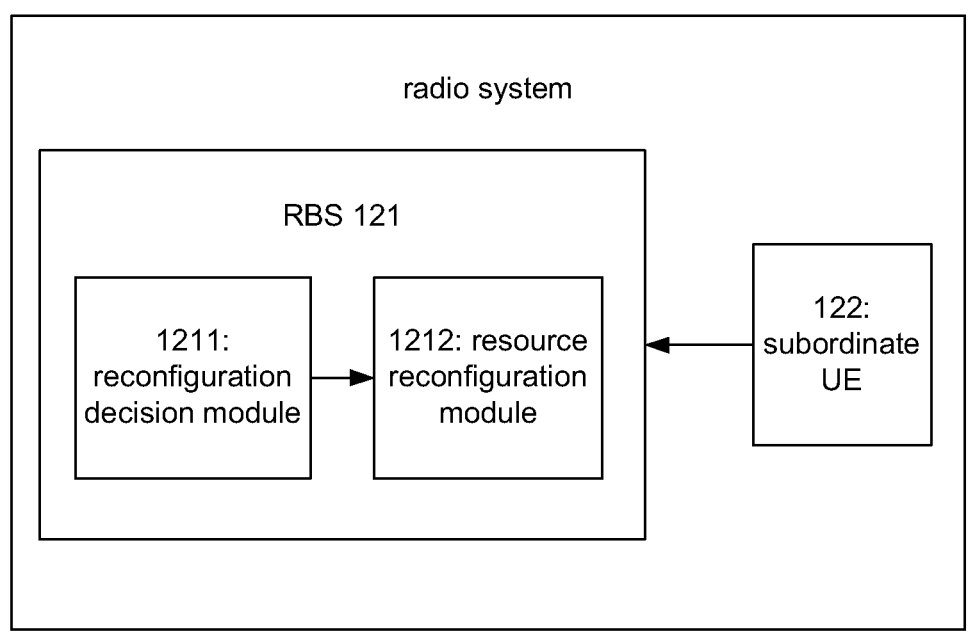
FIG. 12 is a structural diagram of a fourth embodiment illustrating implementation of a radio system according to an embodiment of the present disclosure.

An embodiment of the present disclosure further provides a radio system corresponding to the fourth method of reconfiguration of spectrum resources of a radio system. FIG. 12 is a structural diagram of the fourth embodiment illustrating implementation of a radio system of an embodiment of the present disclosure. As shown in FIG. 12, the system includes: an RBS 121 and a subordinate UE 122, wherein the RBS 121 further includes a reconfiguration decision module 1211 and a resource reconfiguration module 1212, wherein the reconfiguration decision module 1211 is configured to, when reconfiguration of spectrum resources is triggered, generate a reconfiguration command, and send the reconfirmation command to the resource reconfiguration module 1212;

the resource reconfiguration module 1212 is configured to execute the reconfiguration of the reconfiguration command;

the subordinate UE 122 is configured to access to a reconfigured RBS when the network is interrupted.

The above are only preferred embodiments of the present disclosure and should not be used to limit the protection scope of the present disclosure. Any modifications, equivalent replacements, improvements and the like within the spirit and principle of the present disclosure shall fall within the scope of protection of the present disclosure.

INDUSTRIAL APPLICABILITY

When reconfiguration of spectrum resources is triggered, an RBS divides, subordinate nodes into groups according to attributes of the subordinate nodes, and sends a reconfiguration command to a subordinate node in a designated group, and the RBS and the subordinate node executes reconfiguration of spectrum resources according to the reconfiguration command; or, the RBS executes reconfiguration of spectrum resources according to the reconfiguration command; and a subordinate UE is connected, when the network is interrupted, to a reconfigured RBS, thus the present disclosure realizes reconfiguration of spectrum resources of a cognitive radio system and solves the disadvantage that there is no feasible spectrum resource reconfiguration method of a cognitive radio system in the prior art.

The invention claimed is:

1. A method for reconfiguring a spectrum resource of a radio system, wherein the method comprises:
    transmitting, by a Reconfigurable Base Station (RBS), a reconfiguration command to a group of subordinate nodes;
    executing, by the RBS and the subordinate nodes, reconfiguration of spectrum resources according to the reconfiguration command;
    wherein the reconfiguration command is generated by a node of an upper layer of the RBS; receiving, by the RBS, the reconfiguration command from the node of the upper layer of the RBS, filtering and/or converting the received reconfiguration command, and sending the filtered and/or converted reconfiguration command to the subordinate node;
    wherein the group subordinate nodes are obtained by means of dividing, by the RBS, subordinate nodes into groups according to attributes of the subordinate nodes: applying the same reconfiguration strategy to subordinate nodes in the same group, and the same reconfiguration command accordingly: configuring, by the RBS, the same identifier for the subordinate nodes in the same group: finding, by the RBS, all subordinate nodes in the group according to the identifier.

2. The method according to claim 1, wherein
    the reconfiguration command carries a reconfiguration command sending parameter, the reconfiguration command sending parameter comprises: a reconfiguration time, and/or a reconfiguration target frequency band, and/or transmitting parameter limitation of the target frequency band, and/or an allowed working time, and/or a reconfiguration coverage area.

3. The method according to claim 1, wherein the attributes of the subordinate nodes comprise: positions, and/or frequencies, and/or Quality of Service (QoS), and/or access time.

4. The method according to claim 1, wherein the step of transmitting, by an RBS, a reconfiguration command to a group of subordinate nodes comprises: sending, by the RBS, the reconfiguration command to a designated subordinate node by means of group transmission.

5. The method according to claim 4, wherein when the group only contains one subordinate node, the reconfiguration command is sent to the subordinate node separately; when the group contains all subordinate nodes of the RBS, a unified sending method is applied.

6. The method according to claim 4, wherein the method further comprises:
when the subordinate node accesses a network initially, the RBS allocates an independent identifier for the subordinate node, and/or allocates a group identifier after grouping according to attributes, and/or allocates identifiers for all subordinates;
when the reconfiguration command is sent by groups, after a subordinate node obtains an identifier, updating a group identifier continuously according to attribute changes of the subordinate node during subsequent running.

7. The method according to claim 5, wherein the method further comprises:
when the subordinate node accesses a network initially, the RBS allocates an independent identifier for the subordinate node, and/or allocates a group identifier after grouping according to attributes, and/or allocates identifiers for all subordinates;
when the reconfiguration command is sent by groups, after a subordinate node obtains an identifier, updating a group identifier continuously according to attribute changes of the subordinate node during subsequent running.

8. The method according to claim 1, wherein
when the reconfiguration of the spectrum resources is triggered, generating, by the node of the upper layer of the RBS, the reconfiguration command, and/or before sending, by the RBS, the received reconfiguration command to the subordinate node, the method further comprises: sending, by the RBS, a feedback acknowledgement message to the node of the upper layer of the RBS, and/or
after executing, by the RBS and the subordinate node, the reconfiguration of the spectrum resources, the method further comprises: after completing the reconfiguration of the spectrum resources, feeding back, by the RBS, a reconfiguration situation to the node of the upper layer of the RBS.

9. A radio system, wherein the system comprises: a Reconfigurable Base Station (RBS) and subordinate nodes, wherein the RBS is configured to divide subordinate nodes into groups according to attributes of the subordinate nodes, send a reconfiguration command to a subordinate node in a designated group, and execute reconfiguration of spectrum resources according to the reconfiguration command;
the subordinate node is configured to execute reconfiguration of spectrum resources according to the reconfiguration command;
wherein the system further comprises: a node of an upper layer of the RBS, the node of the upper layer of the RBS configured to generate the reconfiguration command;
the RBS is further configured to receive the reconfiguration command from the node of the upper layer of the RBS, filter and/or convert the received reconfiguration command, and send the filtered and/or converted reconfiguration command to the subordinate node;
wherein the RBS is further configured to divide subordinate nodes into groups according to attributes of the subordinate nodes, apply the same reconfiguration strategy to subordinate nodes in the same group, and the same reconfiguration command accordingly: configure the same identifier for the subordinate nodes in the same group, and find all subordinate nodes in the group according to the identifier.

10. The system according to claim 9, wherein
the RBS is further configured to, before sending the received reconfiguration command to the subordinate node, send a feedback acknowledgement message to the node of the upper layer of the RBS, and/or
the RBS is further configured to, after completing the reconfiguration of the spectrum resources, feed back a reconfiguration situation to the node of the upper layer of the RBS.

11. A radio system, wherein the system comprises a Reconfigurable Base Station (RBS) and subordinate nodes;
the RBS is configured to, when reconfiguration of spectrum resources is triggered, generate a reconfiguration command, and divide the subordinate nodes into groups according to attributes of the subordinate nodes, and send the reconfiguration command to a subordinate node in a designated group;
the RBS is further configured to execute the reconfiguration of the spectrum resources according to the reconfiguration command;
the subordinate node is configured to execute the reconfiguration of the spectrum resources according to the reconfiguration command;
the RBS is further configured to divide subordinate nodes into groups according to attributes of the subordinate nodes, apply the same reconfiguration strategy to subordinate nodes in the same group, and the same reconfiguration command accordingly: configure the same identifier for the subordinate nodes in the same group, and find all subordinate nodes in the group according to the identifier.

* * * * *